United States Patent
Oda et al.

(10) Patent No.: US 7,551,217 B2
(45) Date of Patent: Jun. 23, 2009

(54) SOLID-STATE IMAGE SENSOR OBVIATING DEGRADATION OF IMAGE QUALITY AND APPARATUS USING THE SAME

(75) Inventors: Kazuya Oda, Asaka (JP); Tomohiro Sakamoto, Miyagi (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 597 days.

(21) Appl. No.: 11/280,450

(22) Filed: Nov. 17, 2005

(65) Prior Publication Data

US 2006/0119726 A1    Jun. 8, 2006

(30) Foreign Application Priority Data

Nov. 19, 2004   (JP) .............................. 2004-336494
Jun. 15, 2005   (JP) .............................. 2005-175727

(51) Int. Cl.
    *H04N 3/14* (2006.01)
(52) U.S. Cl. .................................................... 348/315
(58) Field of Classification Search ................. 348/294, 348/302, 311, 315
    See application file for complete search history.

(56) References Cited

U.S. PATENT DOCUMENTS

| | | | |
|---|---|---|---|
| 4,602,289 A | * | 7/1986 | Sekine ........................ 348/315 |
| 6,211,915 B1 | * | 4/2001 | Harada ........................ 348/298 |
| 7,274,399 B2 | * | 9/2007 | Oda et al. .................... 348/315 |
| 2003/0048371 A1 | * | 3/2003 | Oda ............................. 348/312 |
| 2004/0046883 A1 | * | 3/2004 | Suzuki ......................... 348/315 |

FOREIGN PATENT DOCUMENTS

JP          04-298175          10/1992

* cited by examiner

*Primary Examiner*—Timothy J Henn
(74) *Attorney, Agent, or Firm*—McGinn IP Law Group, PLLC

(57) ABSTRACT

A solid-state image sensor includes photo-sensitive cells arranged in a bidimensional array for converting incident light to corresponding signal charges. Vertical transfer paths transfer the signal charges read out from the photo-sensitive cells in the vertical direction. The photo-sensitive cells are made up of first and second photo-sensitive cells each having particular sensitivity to incident light. The first and second photo-sensitive cells are positioned at one diagonal corners and the other diagonal corners, respectively, at opposite sides of each vertical transfer path such that the first and second photo-sensitive cells have photo-sensitive areas whose centers of gravity form a rectangle when connected by a virtual line.

24 Claims, 12 Drawing Sheets

SOLID-STATE IMAGE SENSOR OBVIATING DEGRADATION OF IMAGE QUALITY AND APPARATUS USING THE SAME

BACKGROUND OF THE INVENTION

1. Field of the Invention

The present invention relates to a solid-state image sensing device and a solid-state image pickup apparatus using the same, and more particularly to a solid-state image sensor or similar solid-state image sensing device of the type converting incident light representative of a field to an electric signal and dealing with bidimensional image data based on the electric signal. Also, the present invention relates to a solid-state image pickup apparatus of the type catching incident light with the above image sensing device and executing signal processing on the resulting bidimensional image data to record and/or transmit an image produced by the signal processing.

2. Description of the Background Art

Today, a solid-state image sensor, for example, mounted on a digital camera or similar solid-state image pickup apparatus is required to implement both of higher image quality with a greater number of pixels and higher reproducibility of shooting conditions. To enhance reproducibility, providing an image sensing device with a broader dynamic range is under study.

Japanese patent laid-open publication No. 298175/1992, for example, discloses a solid-state image pickup apparatus configured to reproduce an image with a broad dynamic range without causing fixed pattern noise to be involved in a highlight portion. A highlight portion refers to, when bright light, e.g., the quantity of light three to five times as much as one enough to generate a standard signal level, is incident, an extremely light, unreproducible portion is included in the resulting image and viewed simply white or white clip. Also, fixed pattern noise refers to noise appearing as irregularities in a threshold value, which is assigned to the read gate portions of photo-sensitive cells, due to the improvement of a dynamic range implemented by a so-called knee characteristic that compresses data of highlight portions.

More specifically, the image pickup apparatus taught in the above document includes a plurality of sets of photo-sensitive cells which have the optical sensitivity characteristic for photoelectric conversion different from each other. The sets of photosensitive cells form horizontal lines of higher and lower sensitivity cells adjoining each other. Those photosensitive cells are arrayed in bidimensional. With this configuration, the image pickup apparatus reads out signal charges stored in the individual set of photo-sensitive cells and uses, particularly adds, at least one of the resulting two kinds of signal charges in accordance with the quantity of incident light for thereby providing an image with high sensitivity and a broad dynamic range. The signal charges read out from the high-sensitivity photo-sensitive cells are clipped by the output circuit or an external circuit, and then added to the signal of a corresponding pixel, so that fixed pattern noise ascribable to irregularities in saturation is reduced.

The image pickup apparatus provided with the above configuration has a problem that the layout of photosensitive cells is noticeably limited because signal charges stored in the high-sensitivity and low-sensitivity photo-sensitive cells should be read out independently of each other. Moreover, when an extremely light or dark scene is shot, signal charges are read out only from the high-sensitivity or the low-sensitivity photo-sensitive cells, respectively. Stated in another way, only one half of all pixels available with the image pickup apparatus are used for forming an image. The resolution of the resulting image is therefore only one half of the originally expected resolution, thus lowering the image quality.

Some different methods are available for providing photo-sensitive cells with different degrees of sensitivity. A first method provides each photo-sensitive cell with a particular photo-sensitive area, while a second method assigns a particular exposure time to each photo-sensitive cell. Further, a third and a fourth method provide each condenser lens with a particular shape and a particular optical transmissivity, respectively.

Assume that the third or the fourth method is applied to photo-sensitive cells having the same photo-sensitive area for thereby implementing a difference in sensitivity on the basis of optical characteristic. Then, despite that photo-sensitive cells with high sensitivity generate signal charges in dependence upon the quantity of incident light and output them, signal charge levels above a preselected threshold are clipped. Therefore, the photo-sensitive cells with high sensitivity are lower in S/N (Signal-to-Noise) ratio than the photo-sensitive cells with low sensitivity.

Further, it is generally accepted that when a subject to be shot has its luminance distribution narrow, only signal charges read out from the high-sensitivity photo-sensitive cells suffice to output an attractive image. However, the image pickup apparatus stated above shoots a subject completely without considering which of the high-sensitivity and low-sensitivity photo-sensitive cells should be used. Particularly, when the image pickup apparatus produces an image only with the low-sensitivity photo-sensitive cells, the image lacks a sufficient S/N ratio, and is therefore lower in resolution and other factors that determine the image quality.

SUMMARY OF THE INVENTION

It is an object of the present invention to provide a solid-state image sensing device capable of insuring high resolution and high S/N ratio, and therefore obviating the degradation of image quality even when provided with a broad dynamic range, and a solid-state image pickup apparatus using the same.

A solid-state image sensing device of the present invention includes photo-sensitive cells arranged in a bidimensional array for converting incident light to corresponding signal charges. A plurality of vertical transfer paths transfer the signal charges read out from the photo-sensitive cells in the vertical direction. A horizontal transfer path transfers in the horizontal direction the signal charges transferred over the vertical transfer paths. The photo-sensitive cells are made up of first and second photo-sensitive cells each having particular sensitivity to incident light. The photo-sensitive cells are arranged such that the first photo-sensitive cells are positioned at one diagonal corners at opposite sides of each vertical transfer path while the second photo-sensitive cells are positioned at the other diagonal corners at opposite sides of the same path such that the first and second photo-sensitive cells positioned at the diagonal corners have photo-sensitive areas whose centers of gravity form a rectangle when connected by a virtual line.

Also, a solid-state image pickup apparatus of the present invention includes the solid-state image sensing device described above, a signal processor for processing an image signal output from the solid-state image sensing device, a timing generator for generating timing signals for providing each of the solid-state image sensing device and signal processor with a particular operation timing, a drive signal generator for generating drive signals in response to the timing signals, and a controller for determining the scene of a field on the basis of data fed from the signal processor and controlling the signal processor, timing generator and drive signal generator in accordance with the result of the determination. The photo-sensitive cells are made up of first and second photo-sensitive cells each having particular sensitivity to incident light. The first photo-sensitive cells are positioned at one diagonal corners at opposite sides of each vertical transfer path while the second photo-sensitive cells are positioned at the other diagonal corners at opposite sides of the vertical transfer path such that the first and second photo-sensitive cells positioned at the diagonal corners have photo-sensitive areas whose centers of gravity form a rectangle when connected by a virtual line.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
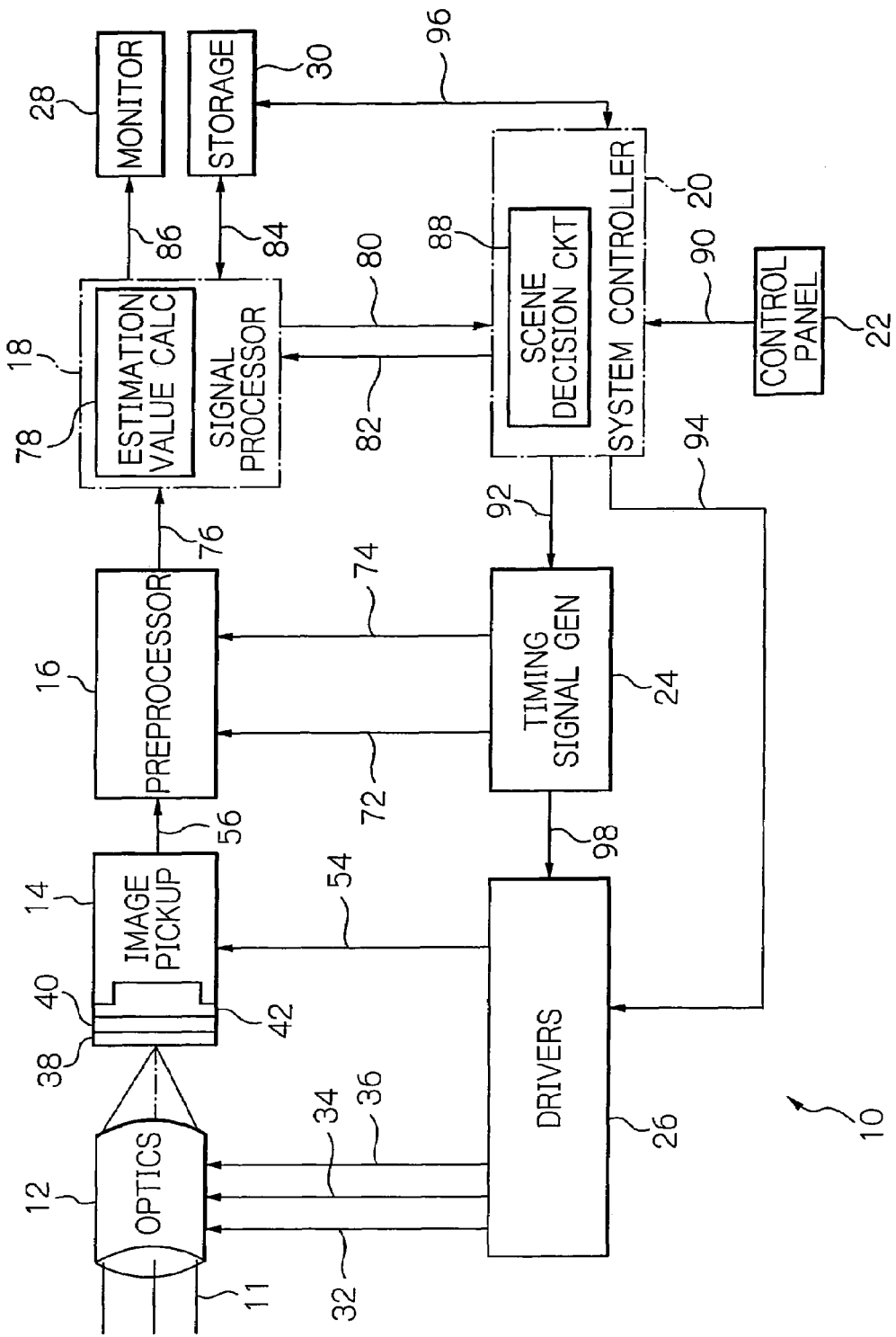
FIG. 1 is a schematic block diagram showing a preferred embodiment of a solid-state image pickup apparatus in accordance with the present invention.

Referring to FIG. 1 of the accompanying drawings, a solid-state image pickup apparatus embodying the present invention is implemented in the form of digital camera by way of example. It is to be noted that part of the illustrative embodiment not directly relevant to the understanding of the present invention is not shown, and detailed description thereof will not be made in order to avoid redundancy.

As shown in FIG. 1, the digital camera, generally 10, includes optics 12, an image pickup section 14, a preprocessor 16, a signal processor 18, a system controller 20, a control panel 22, a timing signal generator 24, drivers 26, a monitor display 28 and a storage 30 which are interconnected as illustrated. The optics 12 includes a mechanical shutter, a lens system, a zoom mechanism, an iris control mechanism and an automatic focus (AF) control mechanism, although not shown specifically. The optics 12 is configured to catch incident light 11 representative of a field to be shot to conduct it to the image pickup section 14 with the various mechanisms mentioned above being controlled.

The drivers 26 are adapted to feed control signals 32, 34 and 36 to electric motors, not shown, each being drivably connected to one of the above mechanisms of the optics 12. The iris control mechanism, having an automatic exposure (AE) control function, includes a ring portion configured to rotate in response to the drive signal 34 for adjusting the aperture of an iris diagraph, although not shown specifically. The mechanical shutter of the iris control mechanism may alternatively be included in the lens system as a lens shutter, if desired.

The mechanical shutter prevents light 11 from being incident on the image pickup section 14 except the time of a shot, i.e., selectively opens or closes a shutter in response to the drive signal 36 fed from the drivers 26. Further, in the illustrative embodiment, the mechanical shutter is driven by a control signal generated in accordance with a parameter relating to exposure, which will be described specifically later, to determine, as a consequence, an exposure time in terms of a period of time defined by the start and the end of exposure.

The image pickup section 14 includes an image sensor or image sensing device 42 that includes an optical low-pass filter 38 and a color filter 40 arranged thereon. The optical low-pass filter 38 is adapted to filter out the spatial frequencies of imagewise light 11 incident on the image sensor 42 above the Nyquist frequency. The color filter 40 has color filter segments positioned in one-to-one correspondence to photo-sensitive cells, which are arranged in the image sensor 42, at the light incidence side of the image sensor 42. The color filter 40 separates the color components of the incident light in accordance with the spectral characteristic of the individual color filter segments.

Figure 2:
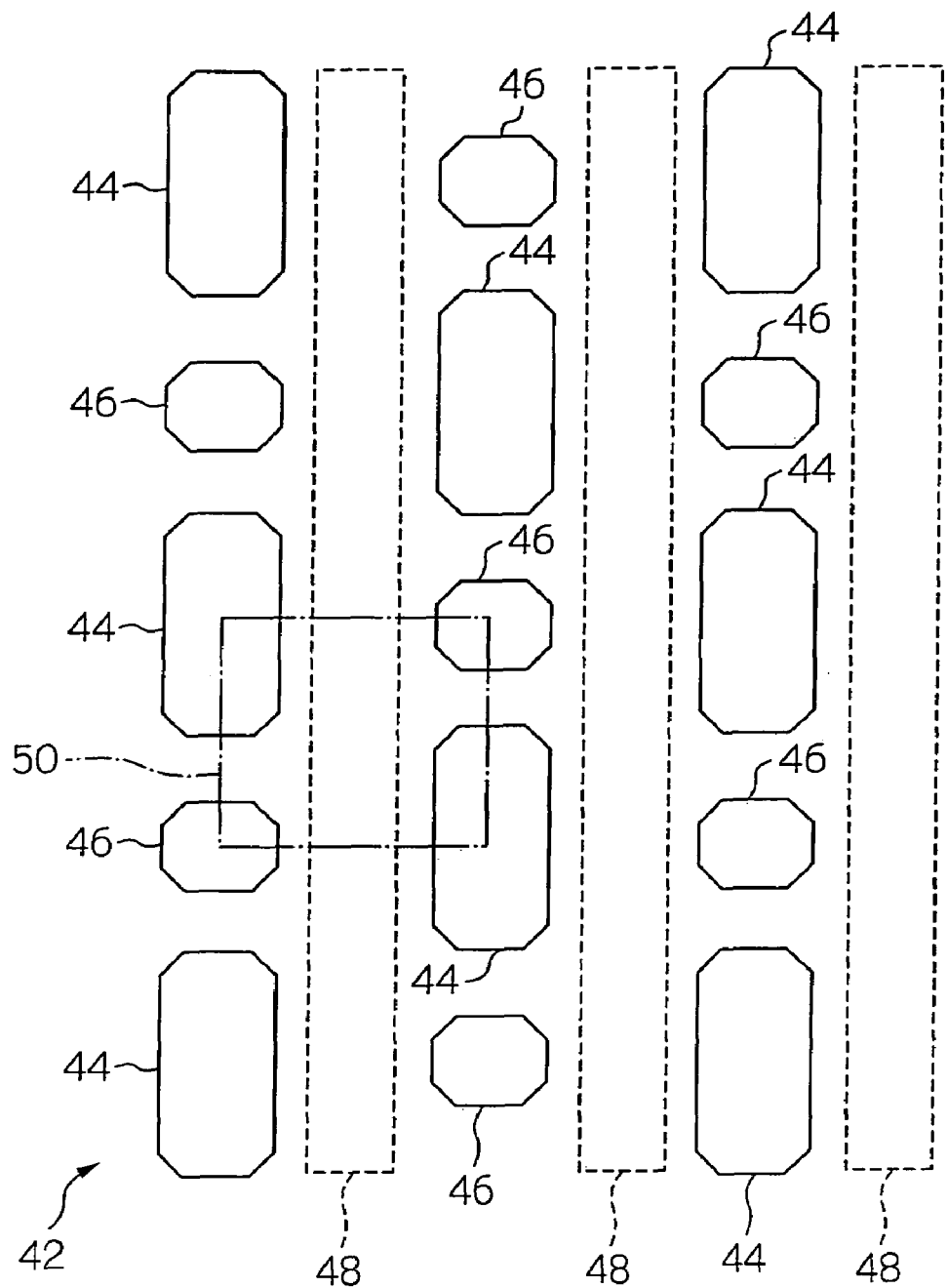
FIG. 2 is a schematic plan view showing part of a specific arrangement of pixels in a solid-state image sensor included in the illustrative embodiment.

FIG. 2 shows part of a specific configuration of the solid-state image sensor 42. As shown, a plurality of photo-sensitive cells 44 and another plurality of photo-sensitive cells 46 are bidimensionally arranged in order to convert light incident thereto to corresponding electric signals. The photo-sensitive cells 44 each are provided with an octagonal planer shape relatively longer in the transfer direction of vertical transfer paths 48 indicated by dotted lines in FIG. 2. The other photo-sensitive cells 46 each are also octagonal, but relatively shorter than the cells 44 in the transfer direction of the vertical transfer paths 48. In this configuration, each photo-sensitive cell 44 has its optical opening or aperture whose photo-sensitive area is greater than usual one, whereas each of the other photo-sensitive cells 46 has its opening whose photo-sensitive area is smaller than the same.

The photo-sensitive cells 44 and 46 different in photo-sensitive area from each other, as stated above, attain high and low sensitivity, respectively, for a given intensity of incident light common to both. Particularly, the illustrative embodiment is advantageous in that the photo-sensitive cells 44 thus structured serve to accomplish an increased saturation level available with high-sensitivity cells. For example, if the saturation ratio of the photo-sensitive cells 46 is made one-fourth, then it is possible to increase the length in the longitudinal direction on each photo-sensitive cell 44 to three-fourths.

Figure 3:
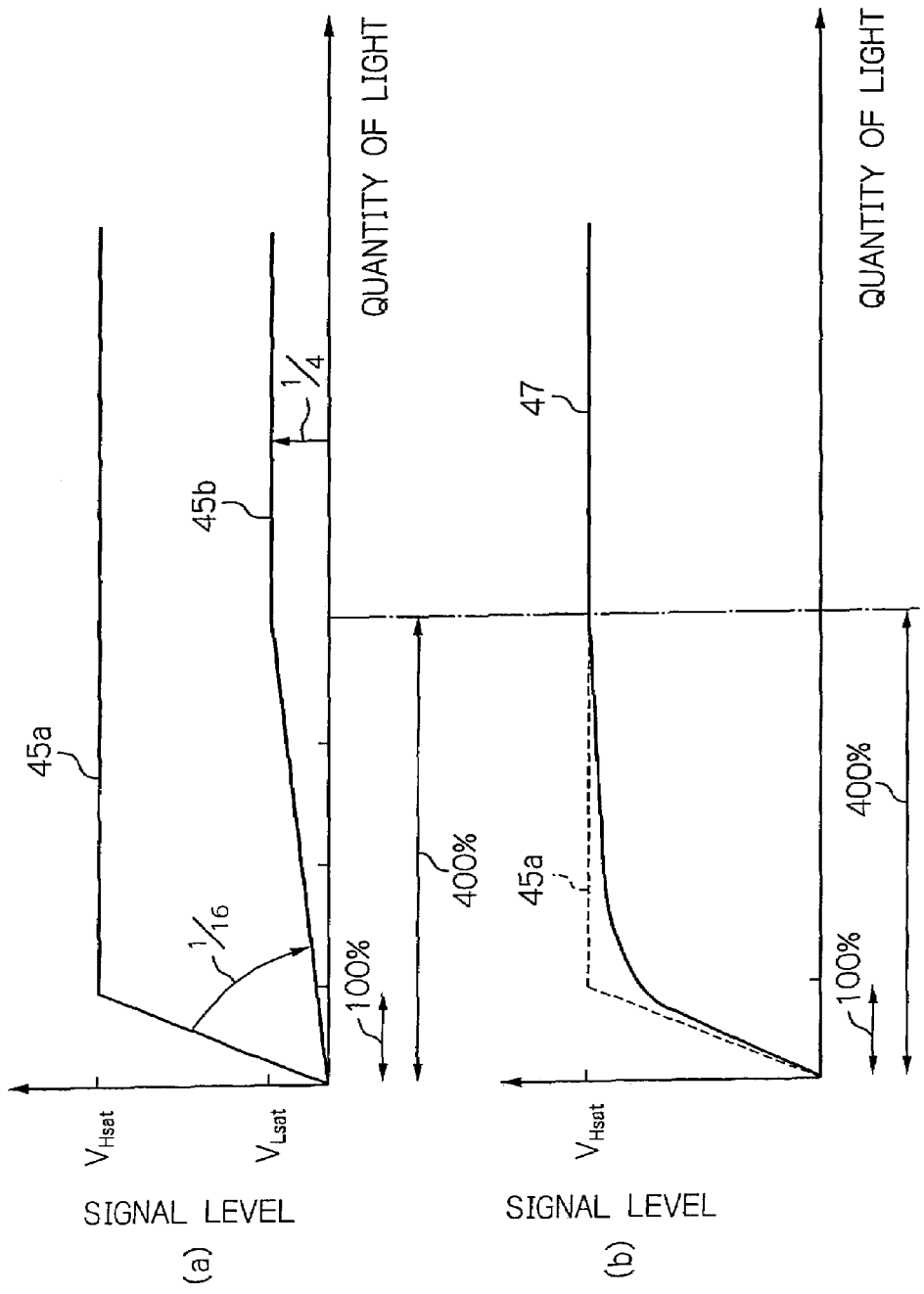
FIG. 3 plots curves useful for understanding how the illustrative embodiment broadens a reproducible range on the basis of a relation between the quantity of incident light and a signal level particular to each of high-sensitivity and low-sensitivity photo-sensitive cells included in the image sensor shown in FIG. 2.

Further, the sizes of the photo-sensitive cells 44 and 46 are dependent on factors relating to the dynamic range thereof. FIG. 3, part (a), shows a specific case wherein the sensitivity of the photo-sensitive cells 46 is quadrupled on the assumption that the dynamic range of the photo-sensitive cells 44 is 100% and that high-sensitivity cells have a saturation level of $V_{Hsat}$.

As shown in FIG. 3, part (a), the photo-sensitive cells 44 and 46 output signals whose levels 45a and 45b, respectively, vary in accordance with the quantity of light incident thereto. In this case, to reproduce a dynamic range which is 400% of a reference level with the photo-sensitive cell 46, it is preferable that the sensitivity and saturation ratio of the photo-sensitive cell 44 be reduced to one-sixteenth and one-fourth, respectively. The photo-sensitive cell 46 is provided with a saturation level of $V_{Lsat}$ as a low-sensitivity cell. In the illustrative embodiment, the saturation level is determined in terms of the photo-sensitive area. FIG. 3, part (b), shows a curve 47 showing that, by combining the signals output from the two kinds of photo-sensitive cells 44 and 46, it is possible to broaden the reproducible range to a 400% dynamic range.

The photo-sensitive cells 44 guarantee the S/N ratio thereof high enough for high-sensitivity cells. In this manner, the digital camera 10 of the illustrative embodiment is adapted for receiving incident imagewise light 11 with a plurality of degrees of optical sensitivity, thus being capable of shooting a desired field with broader dynamic range. Further, in the illustrative embodiment, the digital camera 10 is capable of reading out signal charges resulting from a shot in either one of a low-sensitivity mode that covers an ISO (International Organization for Standardization) sensitivity range of from about 100 to about 400 and a high-sensitivity mode that covers an ISO sensitivity range of 800 or above. By converting the signal charges thus read out to pixel data and then adding the pixel data, it is possible to efficiently guarantee the desirable dynamic range and therefore high image quality.

While in the illustrative embodiment the photo-sensitive cells 44 and 46 are provided with different degrees of sensitivity relative to each other in terms of the size of the photo-sensitive area, such a scheme for varying relative sensitivity is only illustrative. For example, microlenses may be assigned one-to-one correspondence to photo-sensitive cells to be provided with relatively higher sensitivity, but not assigned to photo-sensitive cells to be provided with relatively lower sensitivity. Alternatively, the relative difference in sensitivity may be implemented by different materials specific to the two groups of photo-sensitive cells or areas.

Paying attention to the arrangement of the photo-sensitive cells 44 and 46, as shown in FIG. 2, the photo-sensitive cells or areas 44 and 46 have the respective centers of gravities, although virtually, which may be connected together by an imaginary dash-and-dot line 50. While the imaginary line 50 is shown as being oblong or rectangular, it may, of course, be square, if desired. As FIG. 2 indicates, the photo-sensitive cells 44 and 46 are arranged in a lattice without being shifted from each other. Basically, the photo-sensitive cells 44 are positioned at one diagonally opposite corners of the rectangle 50 while the other photo-sensitive cells 46 are positioned at the other diagonally opposite corners of the same, so that the photo-sensitive cells 44 and 46 each are provided with a particular saturation ratio.

The basic arrangement stated above is repeated over the entire photo-sensitive surface of the image sensor 42. Consequently, as shown in FIG. 2, the high-sensitivity and low-sensitivity photo-sensitive cells 44 and 46 alternately intersect each other at opposite sides of each vertical transfer path 48.

As far as one of the high-sensitivity photo-sensitive and low-sensitivity cells 44 and 46 are concerned, the cells 44 or 46 are arranged as if pixels were shifted. Paying attention to the photo-sensitive cells 44, they are present on every line and therefore prevent vertical resolution from being halved, compared to Japanese patent laid-open publication No. 298175/1992 mentioned previously. Further, when the arrangement shown in FIG. 2 is regarded as a honeycomb pattern, the photo-sensitive cells 46 are located at the positions of virtual pixels at which the photo-sensitive cells 44 are absent. Virtual pixels can be generated by interpolation by use of pixel data actually present at the photo-sensitive cells 44. The interpolation prevents horizontal and vertical resolutions from being deteriorated and particularly contributes to the enhancement of horizontal resolution.

Figure 4:
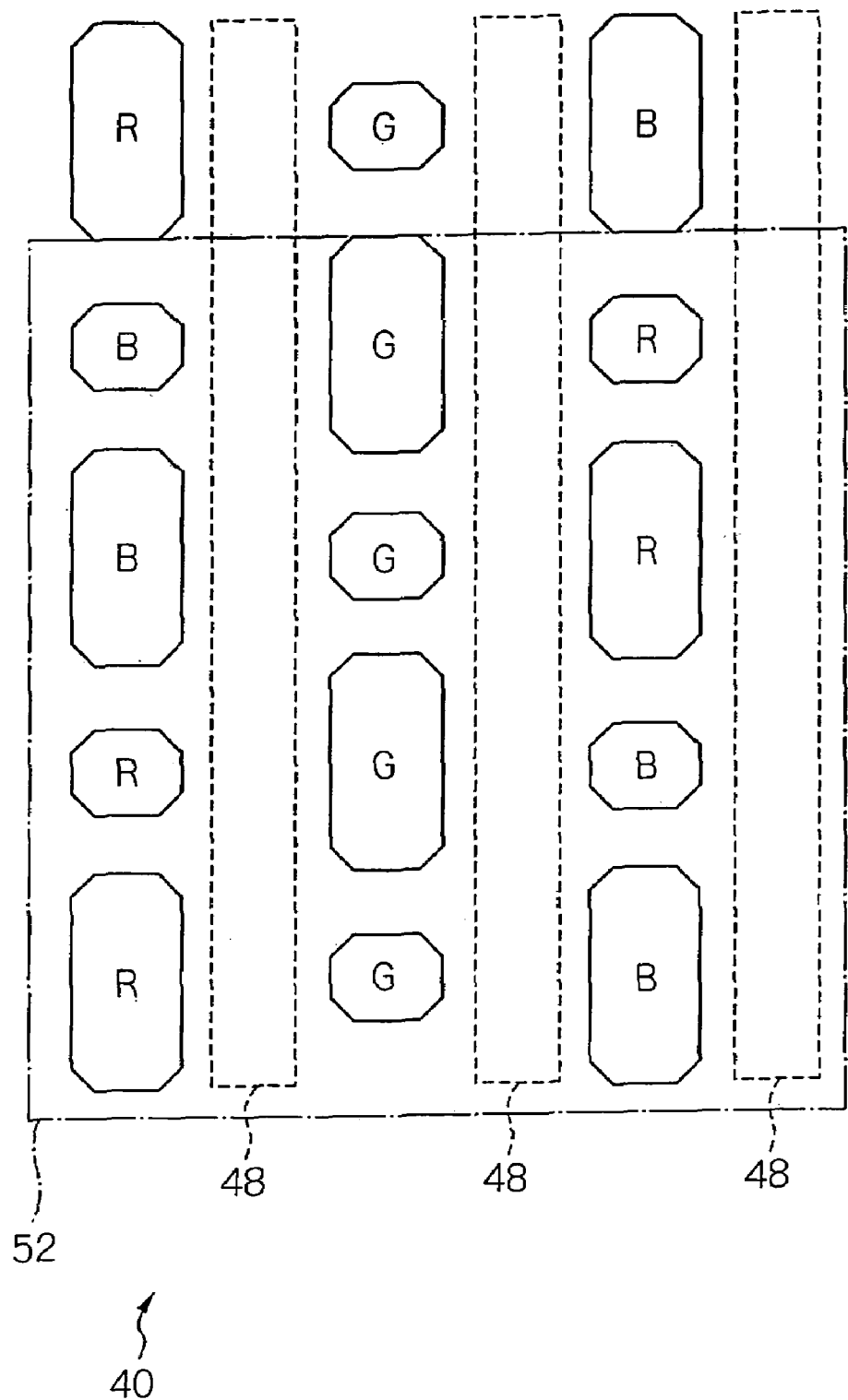
FIG. 4 is a schematic partial plan view of the color filter segments arranged in one-to-one correspondence to the pixels of FIG. 2.

FIG. 4 shows a specific arrangement of color filter segments unique to the illustrative embodiment. As shown, R (red), G (green) and B (blue), or primary color, filter segments are arranged such that each high-sensitivity photo-sensitive cell 44 and the low-sensitivity photo-sensitive cell 46 right above the former cell 44 are dealt with as a set of cells having the same color. In this condition, the color filter 40 may be regarded as an assembly of units each including four rows and three columns surrounded by a dash-and-dot line 52 in the figure. The R and B filter segments are arranged in vertical columns at the opposite sides of each vertical column of G filter segments. In this sense, the color filter 40 is arranged in a G stripe, RB full-checkerboard pattern; a full-checkerboard pattern refers to the arrangement of the same color at diagonally opposite positions.

In the image sensor 42, each of the photo-sensitive cells 44 and 46 converts light 11 incident thereto at the time of exposure to a corresponding signal charge and stores the signal charge therein. Signal charges so stored in the individual photo-sensitive cells 44 and 46 are read out to the vertical transfer paths 48 implemented by charge-coupled devices (CCDs) via corresponding transfer gates (TGs). In the illustrative embodiment, the vertical transfer paths 48 extend straight without meandering because the photo-sensitive cells or pixels 44 and 46 are not shifted in position with the illustrative embodiment To the image sensor 42, a control signal 54 is fed from the drivers 26. The control signal 54 includes a horizontal drive signal, vertical drive signals and an OFD (Over-Flow Drain) signal selectively fed in accordance with the operation mode of the image sensor 42, although not shown specifically. The image sensor 42 delivers an analog voltage signal 56 to the preprocessor 16.

Figure 5:
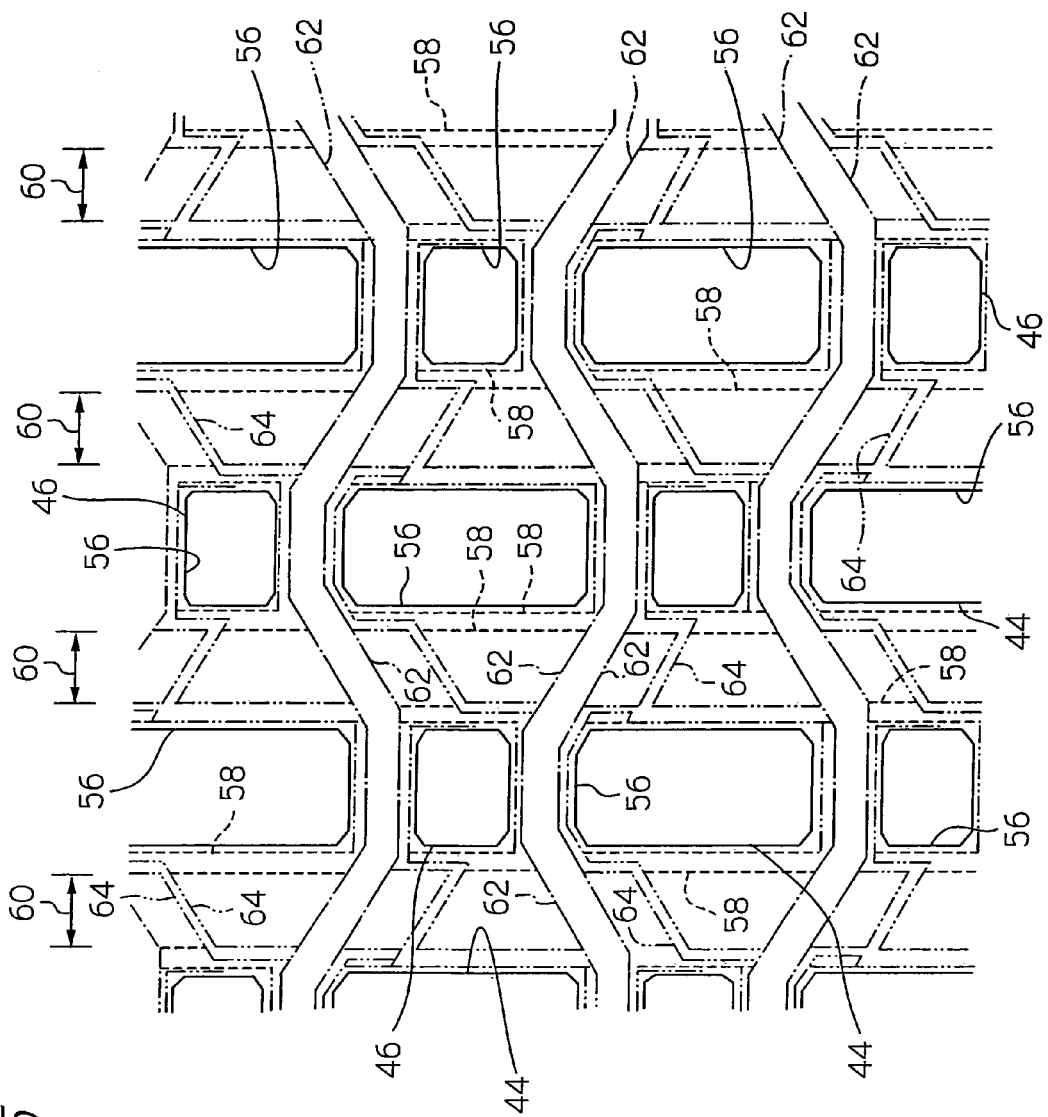
FIG. 5 is a schematic partial plan view of the arrangement of polycrystalline silicon electrodes included in the image sensor of FIG. 2.
Figure 6:
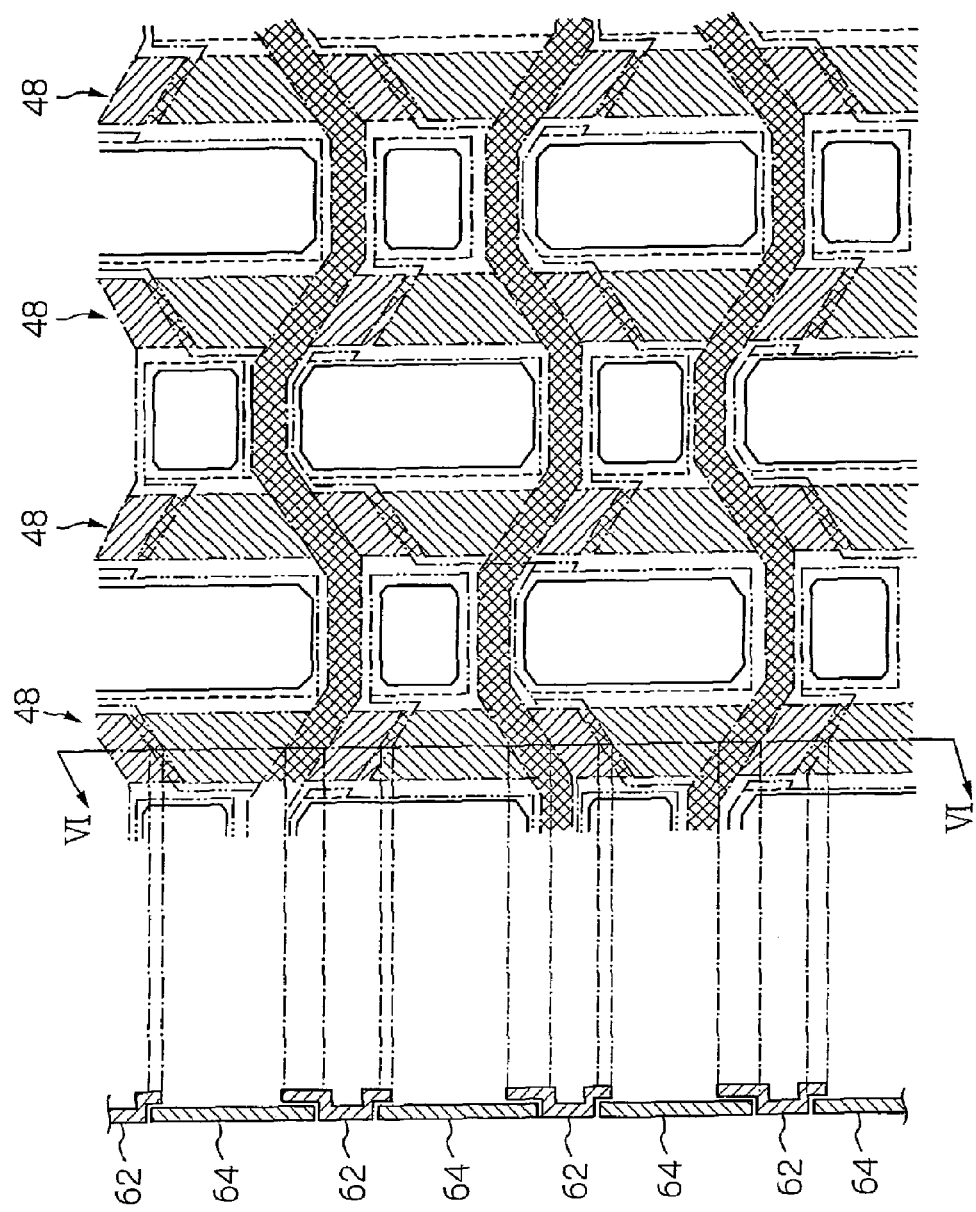
FIG. 6 partially shows a specific shape of the polycrystalline silicon electrodes in a schematic plan view together with the structure of the electrodes in a section along the line VI-VI.

Reference will be made to FIGS. 5 and 6 for describing the structure of the image sensor 42 characterizing the illustrative embodiment. As shown, the photo-sensitive cells 44 and 46 each have a photo-sensitive area 56 indicated by the solid line in FIG. 5. Each vertical transfer path 48 is delimited by, e.g., two guide walls 58 indicated by the dotted lines in FIG. 5 in the horizontal direction, and has its width indicated by dotted lines 60 positioned inside of the opposite guide walls 58. First and second polycrystalline silicon electrodes, respectively indicated by dash-and-dot lines and dash-and-double dots lines 64 and 62, are stacked in two layers for feeding drive signals, which cause signal charges to be transferred in the vertical direction, in the horizontal, or line, direction. Let the polycrystalline silicon electrodes 62 and 64 be referred to as poly-silicon electrodes 62 and 64 for simplicity hereinafter. As best shown in FIG. 6, the poly-silicon electrodes 62 and 64 extend toward the upstream and downstream sides of the vertical transfer paths 48.

It is to be noted that the dash-and-double dots lines 62 shown in FIG. 5 are also representative of wirings for effecting field shift also for the convenience of illustration.

The poly-silicon electrodes 62 and 64 each are arranged such that signal charges stored in the photo-sensitive cells 44 and 46 can be easily read out while being distinguished from each other. Therefore, if the luminance of a subject to be shot can be sufficiently rendered only by the high-sensitivity photo-sensitive cells 44, signal charges are readout only from the photo-sensitive cells 44, as will be described more specifically later. Such a signal reading mode is successful to simplify signal read-out processing, compared to a mode that reads out signal charges from all photo-sensitive cells.

It should be noted that, although the poly-silicon electrodes 64, indicated by the generally horizontally extending dash-and-double dots lines, are depicted as if they had the width thereof greater than the poly-silicon electrodes 62, the former, in practice, have the same width as the latter. The difference in width depicted intends to schematically indicate the fact that the poly-silicon electrodes 62 and 64 are stacked in two layers.

The transfer electrodes included in the illustrative embodiment are characterized in that their shape is not a rectangle which is conventional, but is the combination of a parallelogram or a rhomb and a trapezoid. Paying attention to such a shape, the arrangement of the poly-silicon electrodes 62 and 64 will be described in more detail with reference to FIG. 6.

As shown in FIG. 6, the poly-silicon electrodes 62 and 64 are indicated by the rightward downward hatching and leftward downward hatching, respectively, so that portions where the two electrodes 62 and 64 overlap are indicated by cross-hatching. To clearly show the tridimensional structure of the poly-silicon electrodes 62 and 64, one of the vertical transfer paths 48 is shown in a section along line VI-VI in FIG. 6 also. When the image sensor 42 is viewed from the above, i.e., from the direction in which the incident light beam 11 comes, the poly-silicon electrodes 62 and 64 are parallelogrammatic and trapezoidal, respectively. In the overlapping portions, a poly-silicon layer, forming the poly-silicon electrodes 62, is positioned above a poly-silicon layer forming the poly-silicon electrodes 64. It will therefore be seen that trapezoidal transfer electrodes are formed on the vertical transfer paths 48 upstream of the horizontally extending transfer electrodes 64 while parallelogrammatic transfer electrodes are formed on the paths 48 downstream of the horizontally extending transfer electrodes 62.

Figure 7:
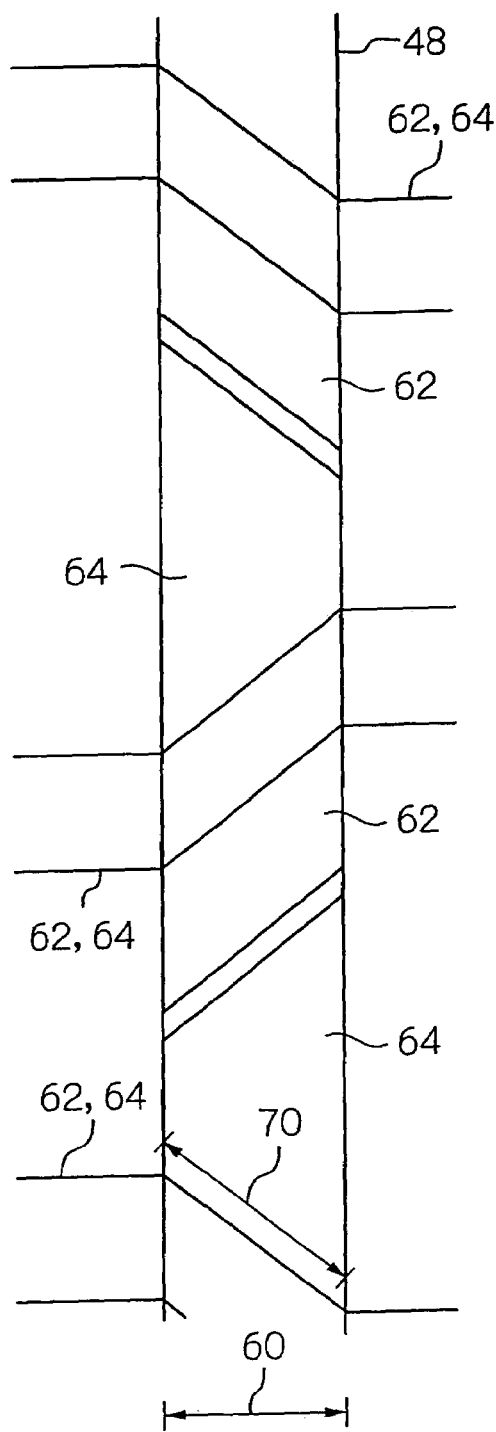
FIG. 7 partially shows, in a simplified form, the polycrystalline silicon electrodes formed on a vertical transfer path.

By repeating the combination of a parallelogram or a rhomb and a trapezoid in a pattern, as stated above, it is possible to make the sectional transfer area of potential wells formed in dependence upon the transfer of signal charges greater than the conventional, rectangular sectional transfer area. The potential wells of the illustrative embodiment have the same depth as conventional potential wells. Thus, as shown in FIG. 7, the poly-silicon electrodes 62 and 64 of the illustrative embodiment are obliquely formed in order to increase the sectional transfer area, i.e., to increase the width 60 to a width 70. This configuration successfully enhances efficient vertical transfer of signal charges read out to the vertical transfer paths 48.

The transfer efficiency thus enhanced contributes a great deal to the cancellation of single-color vertical lines undesirably apt to appear in an image. For example, when a red bulb is used to shoot a white wall and the resulting image signal is subjected to white balance control, a great gain acts on a signal component derived from B pixels and further enhances residual B signal charges, resulting in blue vertical lines appearing in a picture. In the illustrative embodiment, the vertical transfer paths 48 allow signal charges to be transferred over a greater width and therefore within a preselected period of time, thereby obviating residual signal charges. Therefore, even if a great gain acts on a B signal component in a condition wherein single-color vertical lines are apt to appear, the B signal component is prevented from being enhanced to a visible level, i.e., from appearing in an image as blue vertical lines because the signal level corresponding to the pixels has already been lowered substantially to zero. This means that red vertical lines are also controlled.

Figure 8:
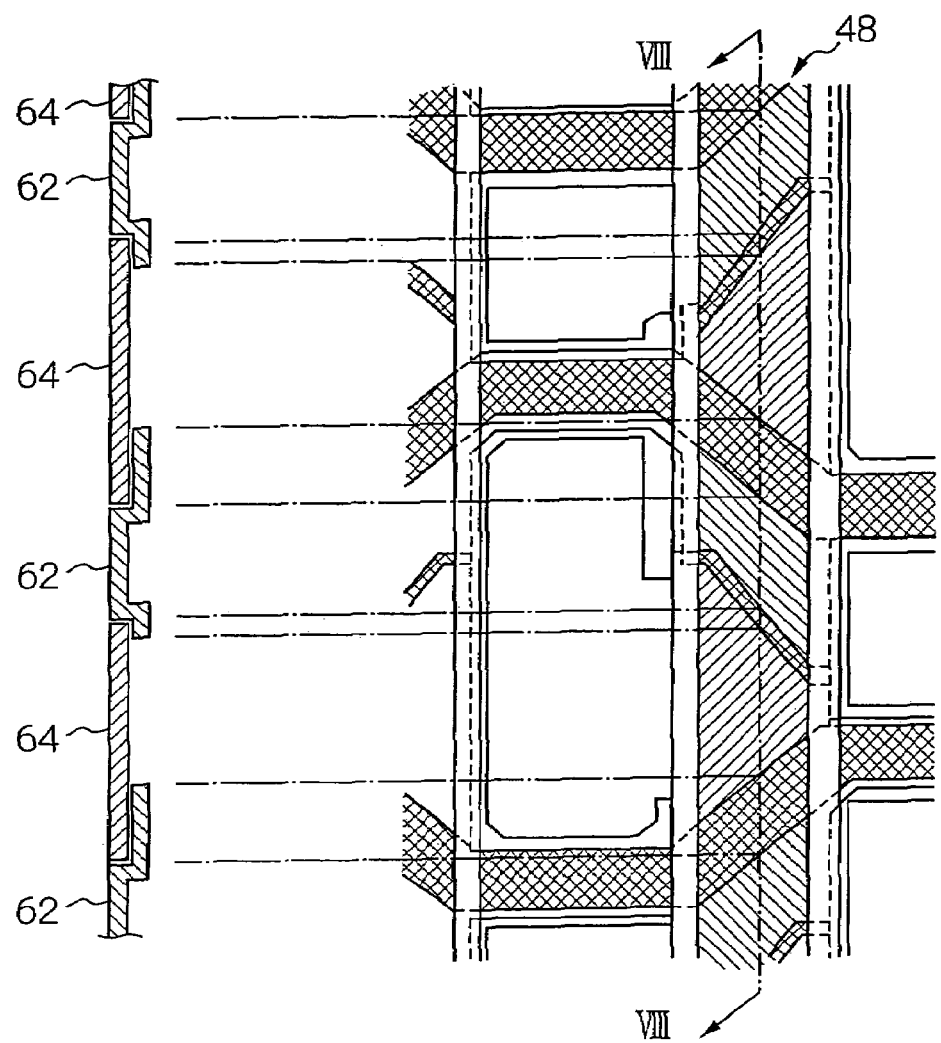
FIG. 8 partially shows, like FIG. 6, another specific shape of the polycrystalline silicon electrodes in a schematic plan view together with the structure of the electrodes in a section along the line VIII-VIII.
Figure 9:
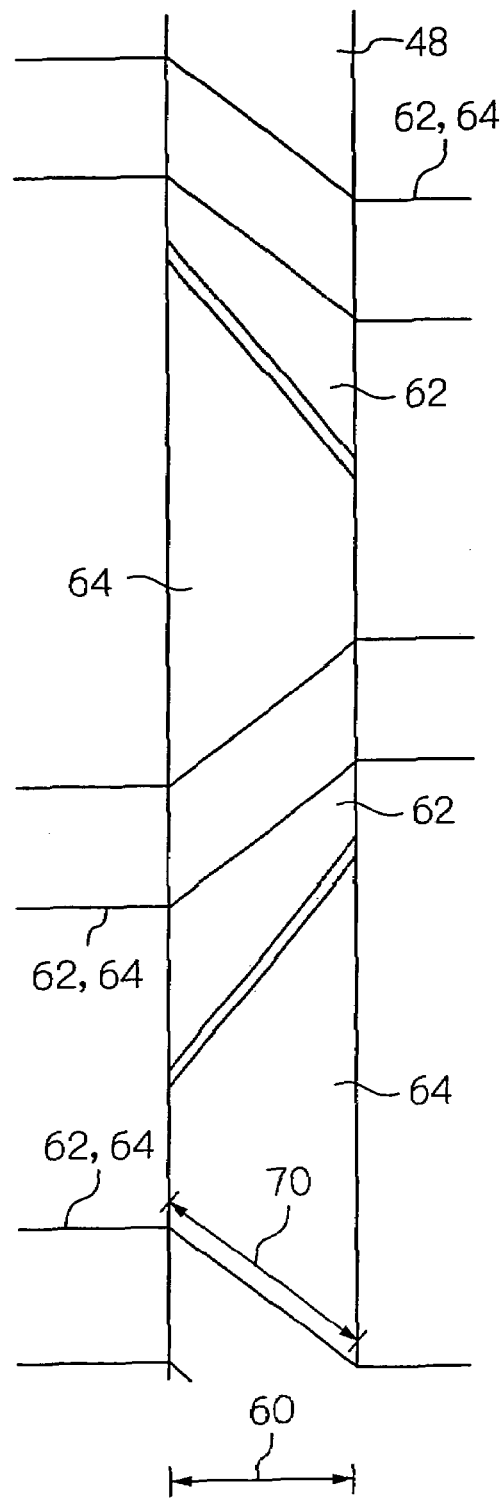
FIG. 9 partially shows, in a simplified form like FIG. 7, the polycrystalline silicon electrodes of FIG. 8 formed on the vertical transfer path.

FIGS. 8 and 9 show another specific configuration of the poly-silicon electrodes 62 and 64. As shown, the poly-silicon electrodes 62 and 64 are not parallelogrammatic and trapezoidal, respectively, but both are trapezoidal. Hatched portions and cross-hatched portions shown in FIG. 8 respectively correspond to the hatched portions and cross-hatched portions shown in FIG. 6. The overlapping structure of the poly-silicon electrodes 62 and 64 is clearly shown in a section along line VIII-VIII in FIG. 8.

Referring again to FIG. 1, the preprocessor 16 includes a correlated double sampling (CDS) circuit for canceling noise, a gain-controlled amplifier (GCA) and an analog-to-digital (A/D) converter, although not shown specifically. The timing signal generator 24 feeds CDS pulses 72 to the CDS circuit as a sampling signal and feeds a conversion clock signal 74 to the A/D converter. The preprocessor 16 executes noise cancellation, wave shaping and digitization and delivers all data resultant from such processing to the signal processor 18 as digital or image data 76.

The signal processor 18 has various functions including a gamma-correction function, a synchronizing function, an image converting function, a compressing/expanding function, an input interface function and an image reducing function. Particularly, in the illustrative embodiment, the signal processor 18 includes an estimation value calculator 78, which includes an automatic white balance (AWB) adjusting circuit and an image data memory, although not shown specifically. The estimation value calculator 78 calculates an iris control value or f-number, a shutter speed, a white balance adjustment value and a gradation correction value in accordance with corrected image data derived from, e.g., preliminary photometry, and then calculates, based on the values thus calculated, accumulated values in order to produce parameters adequate for the image data. In the illustrative embodiment, the signal processor 18 delivers the accumulated values to the system controller 20 in the form of signal 80.

The accumulated values mentioned above include not only the values for the calculation of parameters but also the ratio of B to G, B/G, and the ratio of R to G, R/G. Particularly, the AWB circuit included in the estimation value calculator 78 determines, among the digital data 56 generated by preliminary photometry, a WB gain particular to preselected part of an image. If desired, the estimation value calculator 78 may be included in the system controller 20 instead of in the signal processor 18 and configured to feed gamma-corrected image data thereto.

The digital image data 76 are generally input to the image memory of the signal processor 18 over a data bus in the form of image signal. The operation of the signal processor 18 is controlled by a control signal 82 fed from the system controller 20. To the signal processor 18, a timing signal, not shown, is fed from the timing signal generator 24. The timing signal includes a horizontal synchronizing signal HD, a vertical synchronizing signal VD and clock signals assigned to various circuits to be described later.

The various functions of the signal processor 18 mentioned earlier will be briefly described hereinafter. The gamma-correction function uses data listed in a lookup table to perform gamma correction on the image data fed from the image memory.

As for the synchronizing function, the illustrative embodiment has a single plate of primary color filter applied to the image pickup section 14. Therefore, pixels at which photosensitive cells actually exist produce no pixel data of colors other than the color of the color filter thus provided. In addition, with the illustrative embodiment, when signal charges should sufficiently be read out only from high-sensitivity pixels, image data ate produced from the high-sensitivity photo-sensitive cells 44 in a so-called honeycomb pattern, so that the positions where the low-sensitivity photo-sensitive cells 46 are present constitute virtual pixels in the honeycomb pattern. Nevertheless, the illustrative embodiment produces actual pixel data from the photo-sensitive cells 46 as useful information, and therefore makes position or spatial information more accurate than the conventional scheme using a simple honeycomb arrangement.

More specifically, the synchronizing function executes interpolation while taking account of colors not available with either one of the actual or virtual pixels, thereby producing all of the three primary colors at each pixel. Interpolation may be effected by, e.g., multiplying the individual pixels by weighting coefficients on the basis of a correlation between the pixel data, adding the resulting products, and then producing a mean value of the resulting sum. In this manner, three primary colors can be produced for a subject pixel at the same time. The term "synchronization" is used in this sense. Alternatively, interpolation may be executed with G pixel data or luminance data Y so as to broaden the band of the resulting pixel data. In any case, the image data thus synchronized will be stored in the image memory.

The image converting function multiplies the synchronized image data of three primary colors by a preselected coefficient for thereby executing color-difference matrix processing. Further, this function executes contour or edge enhancement with luminance data Y generated and color enhancement with color data $C_b$ and $C_r$ generated. Image data representative of the luminance data Y and color data or color difference data $C_b$ and $C_r$ are written to the image memory. In the case where raw data are to be written to the image memory, neither the image-converting function nor the compressing/expanding function, which will be described hereinafter, is executed.

The compressing/expanding function compresses image data Y/C and color difference data fed thereto in a photo mode i.e. still-picture mode or a movie mode by using the JPEG (Joint Photographic coding Experts Group) standard, MPEG (Moving Picture coding Experts Group)-1 or MPEG-2 standard or similar standard. The input interface function adjusts electric conditions and timing in the event of writing in or reading out image data to or from a storage card type of recording medium loaded on the storage receptacle 30. The compressing/expanding function reads out image data 84 from the storage 30, and then expands the image data 84 subjected to input/output interface processing. It is to be noted that expansion is opposite in processing to compression.

The image reducing function converts the image data generated or expanded in the event of reproduction (Y/C and color-difference data) to R, G and B image data, and then formats the image data in the number of pixels that can be displayed on the monitor display 28. Image data 86 thus formatted are input to the monitor display 28. The number of pixels or the size of display is so selected as to protect an image from defects ascribable to pixel skipping or thinning out.

The digital data, i.e., image data 76 are input to and temporarily stored in the image data memory of the signal processor 18. Further, in the various kinds of processing stated above, image data temporarily stored in the image data memory are read out and, will be, after processed, written in to the image memory. When the same image data are expected to be repeatedly read out from the image memory, the image memory should preferably be implemented by a nonvolatile type of memory device.

The system controller 20 is implemented by a microcomputer or a central processing unit (CPU), and configured to control the subsections used in common or digital processing of the entire camera 10. More specifically, the system controller 20 includes a scene decision circuit 88, an EEPROM (Electrically Erasable Programmable Read Only Memory) and a ROM adapted for storing program sequences for operation and instruction. The scene decision circuit 88, implemented by software processing, compares the two ratios B/G and R/G included in the accumulated values 80, and controls the timing signal generator 24 and drivers 26 in accordance with the result of the comparison.

The system controller 20 receives a command signal 90 representative of a mode selected or a trigger from the control panel 22. The system controller 20 then conditions the camera 10 for, e.g., a photo mode or a movie mode and a low-sensitivity mode or a high-sensitivity mode in response to the command signal 90. Further, the system controller 20 receives a pickup timing signal from a shutter release button not shown. The system controller 20 generates control signals 82, 92 and 94 matching the accumulated values 80, and delivers the control signals 82, 92 and 94 to the signal processor 18, timing signal generator 24 and drivers 26, respectively.

The system controller 20 is adapted to additionally take account of line interpolation to be executed in the signal processor 18 and of control over a signal generator and signal processing to output the control signal 82. The system controller 20 further controls writing and reading of image data to and from the storage 30 by means of a control signal 96. In addition, the system controller 20 controls the operation timing of the preprocessor 16.

The control panel 22 includes a mode selector and the shutter release button, although not shown specifically. The mode selector allows the operator of the camera 10 to select, e.g., a photo mode or a movie mode and a low sensitivity mode or a high sensitivity mode available with the camera 10. The low sensitivity and high sensitivity modes are set in consideration of the ISO sensitivity beforehand, and may range from, e.g., the ISO sensitivity of 100 to 1,600. The mode selector sends out a mode command signal 90 representative of the modes thus selected to the system controller 20.

The shutter release button or key is implemented as a button switch having two stepwise strokes or positions, e.g., a first stroke or half-depression position for conditioning the camera 10 for a preliminary shot, and a second stroke or full-depression position for conditioning it for an actual shooting. The command signal 90 is representative of the trigger timing indicating the first and second strokes also.

The timing signal generator 24 generates various timing signals on the basis of a reference or basic clock signal. The timing signals include, in addition to the horizontal transfer signal, a vertical and a horizontal synchronous signal, field shift pulses, a vertical transfer signal and an electronic shutter pulse. The timing signal generator 24 also produces the CDS pulse 72 and conversion clock signal 74 to provide the pre-processor 16 with them. The timing generator 24 feeds the drivers 26 with a timing signal 98, including the vertical and horizontal synchronizing signals, field shift pulses, vertical transfer signal and electronic shutter pulse thus generated.

The drivers 26 are adapted for generating the drive signals 32 through 36 and 54 in response to the timing signal 98 and control signal 94. More specifically, the drivers 26 feed the drive signals 32, 34 and 36 to the lens system and iris control mechanism included in the optics 12 for causing them to effect the AF and AE control. The drive signal 36 causes the mechanical shutter to open and then close in accordance with the timing of an actual shot defined by the shutter release of the control panel 22.

The drive signal 54, generated by the drivers 26 in response to the timing signal 98, is fed to the image sensor 42 of the image pickup section 14 for causing the latter to store signal charges in the photo-sensitive areas of the individual photo-sensitive cells during exposure time. Subsequently, the drivers 26 cause the signal charges to be read out to the vertical transfer paths 48 while controlling the reading operation in response to the output of the scene decision circuit 88 of the system controller 20, which will specifically be described later, and then transferred to a horizontal transfer path, not shown, over the vertical transfer paths 48. Further, the drivers 26 cause the signal charges to be transferred over the horizontal transfer path, and then output via an output amplifier, not shown, in the form of analog voltage signal 56.

The monitor display 28 is adapted to visualize or display on its display device the image data 86 fed from a display controller not shown. The storage 30 includes a semiconductor memory or similar recording medium for recording the image data 84 fed from the signal processor 18. Writing in and reading out image data to and from the storage 30 are executed under the control of the system controller 20.

The operation of the solid-state image sensor 42 will be described more specifically with reference to FIG. 10. As shown, the high-sensitivity photo-sensitive cells 44 and low-sensitivity photo-sensitive cells 46 are arranged on the same line together. Poly-silicon electrodes 100 and 102 are included in the image sensor 42 and stacked in two layers as stated previously. The poly-silicon electrodes 100 and 102 respectively correspond to the poly-silicon electrodes 62 indicated by the dash-and-dot lines and the poly-silicon electrodes 64 indicated by the dash-and-double dots lines. The poly-silicon electrodes 100 are connected only to field shift gates used to read out signal charges stored in the photo-sensitive cells 44, although not shown specifically in FIG. 10. Likewise, the poly-silicon electrodes 102 are connected only to field shift gates used to read out signal charges stored in the photo-sensitive cells 46.

Figure 10:
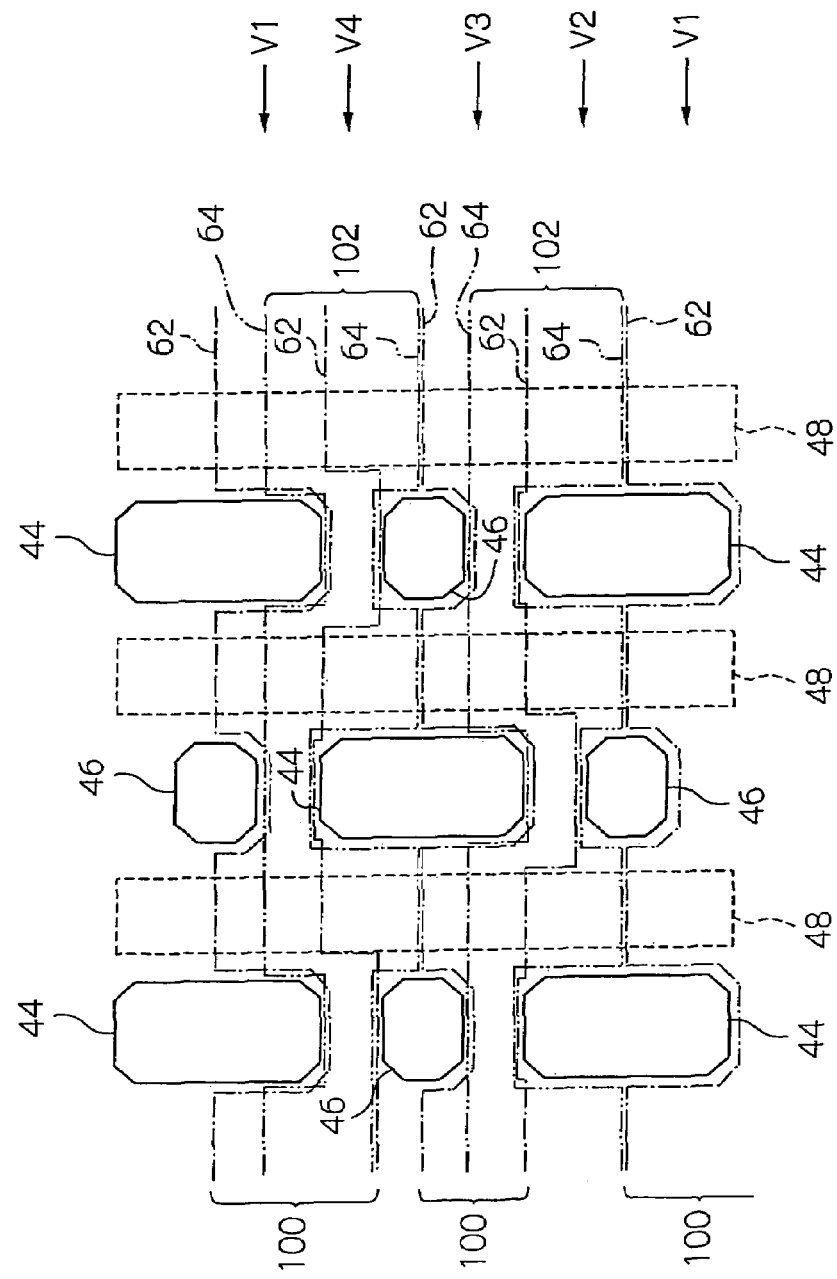
FIG. 10 is a view useful for understanding the read-out of signal charges stored in the photo-sensitive cells shown in FIG. 2 and the vertical transfer thereof.
Figure 11:
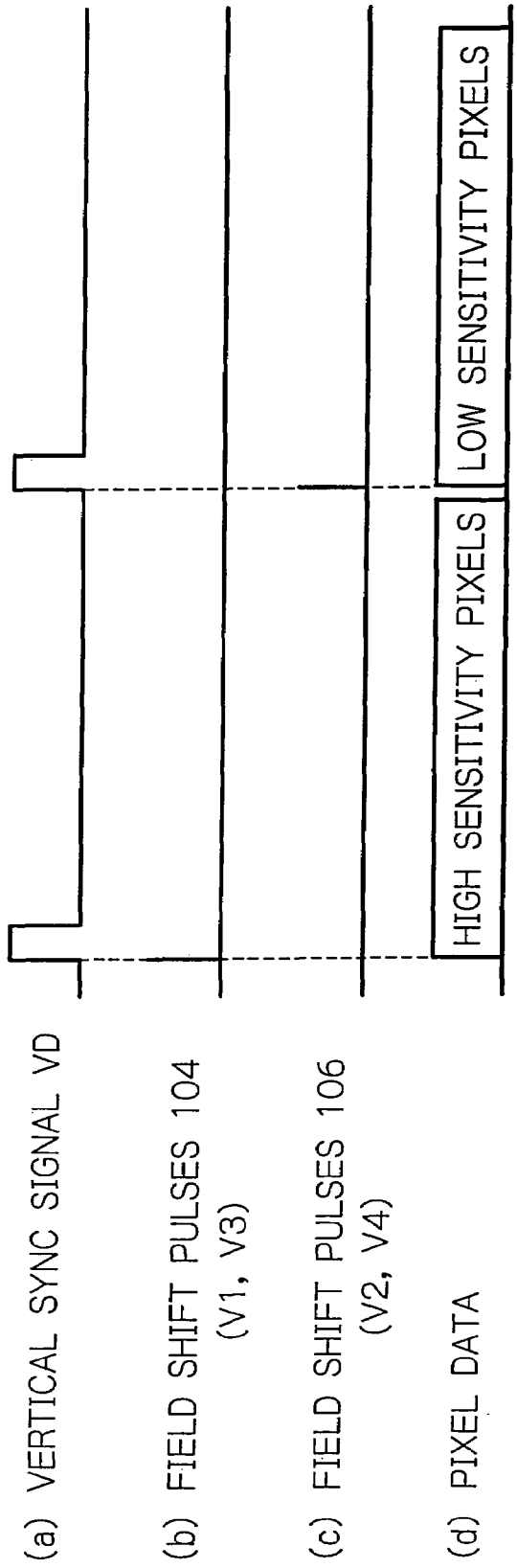
FIG. 11 is a timing chart useful for understanding the read-out of signal charges stored in the photo-sensitive cells of FIG. 2.

A field shift pulse 104 shown in FIG. 11, line (b), i.e., drive signals V1 and V2 shown in FIG. 10, is fed to the poly-silicon electrodes 100 in synchronism with a first vertical synchronizing signal VD shown in FIG. 11, line (a). In response, as shown in FIG. 11, line (d), signal charges read out from the high-sensitivity photo-sensitive cells 44 to the vertical transfer paths 48 are output in the form of analog voltage signal 56 during a single field period. Likewise, a field shift pulse 106 shown in FIG. 11, line (c), i.e., drive signals V2 and V4 shown in FIG. 10, is fed to the poly-silicon electrodes 102 in synchronism with a second vertical synchronizing signal VD shown in FIG. 11, line (a). Consequently, signal charges read out from the low-sensitivity photo-sensitive cells 46 to the vertical transfer paths 48 are output in the form of analog voltage signal 56 during the next single field period, as also shown in FIG. 11, line (d).

It is noteworthy that the four-phase drive signals V1 through V4 applied to the poly-silicon electrodes 100 and 102 allow signal charges read out from the photo-sensitive cells 44 and 46 to be efficiently transferred via the vertical transfer paths 48.

As stated above, the image sensor 42 with the poly-silicon electrodes 100 and 102 is capable of sequentially outputting the analog signals 56 respectively corresponding to high-sensitivity and low-sensitivity signal charges in a single field period each in synchronism with the consecutive field shift pulses 104 and 106. It follows that a sufficiently broad dynamic range is achievable only with the high-sensitivity photo-sensitive cells 44 selected by the decision of the scene decision circuit 88. If the result of decision shows that a high quality image can be produced, then it suffices to read out signals only over a single field, successfully reducing a signal reading time.

The scene decision circuit 88 should preferably make a decision on the scene of a field on the basis of color temperature. For this purpose, the scene decision circuit 88 uses the accumulated values 80 to determine whether or not a color temperature is high. More specifically, the scene decision circuit 88 compares the ratio of the color B to the color G, B/G, and the ratio of the color R to the color G, R/G, included in the accumulated values 80. If the ratio B/G is greater than the ratio R/G, the scene decision circuit 88 determines that the scene is a bluish scene having its color temperature high. In this case, the system controller 20 controls the various sections of the camera 10 in such a manner as to read out signal charges only from the high-sensitivity photo-sensitive cells 44, so that the signal processing is simplified. Conversely, if the ratio R/G is greater than the ratio B/G, the scene decision circuit 88 determines that the scene is a reddish scene having its color temperature low.

In this case, in the signal processor 18, the arrangement of the input signal, i.e., pixels derived from the photo-sensitive cells 44 corresponds to a honeycomb arrangement. By synchronization stated previously, the signal processor 18 can double the number of pixels for thereby enhancing resolution. Further, to broaden the dynamic range of an image, high-sensitivity and low-sensitivity data are read out over two consecutive fields. The signal processor 18 executes gamma correction on each of the high-sensitivity and low-sensitivity pixel data, and then adds corresponding ones of the high-sensitivity and low-sensitivity pixels, e.g., pixel data derived from the photo-sensitive cells 44 and 46 of the same color, as will be seen from FIGS. 1 and 2, by a ratio matching the scene.

Figure 12:
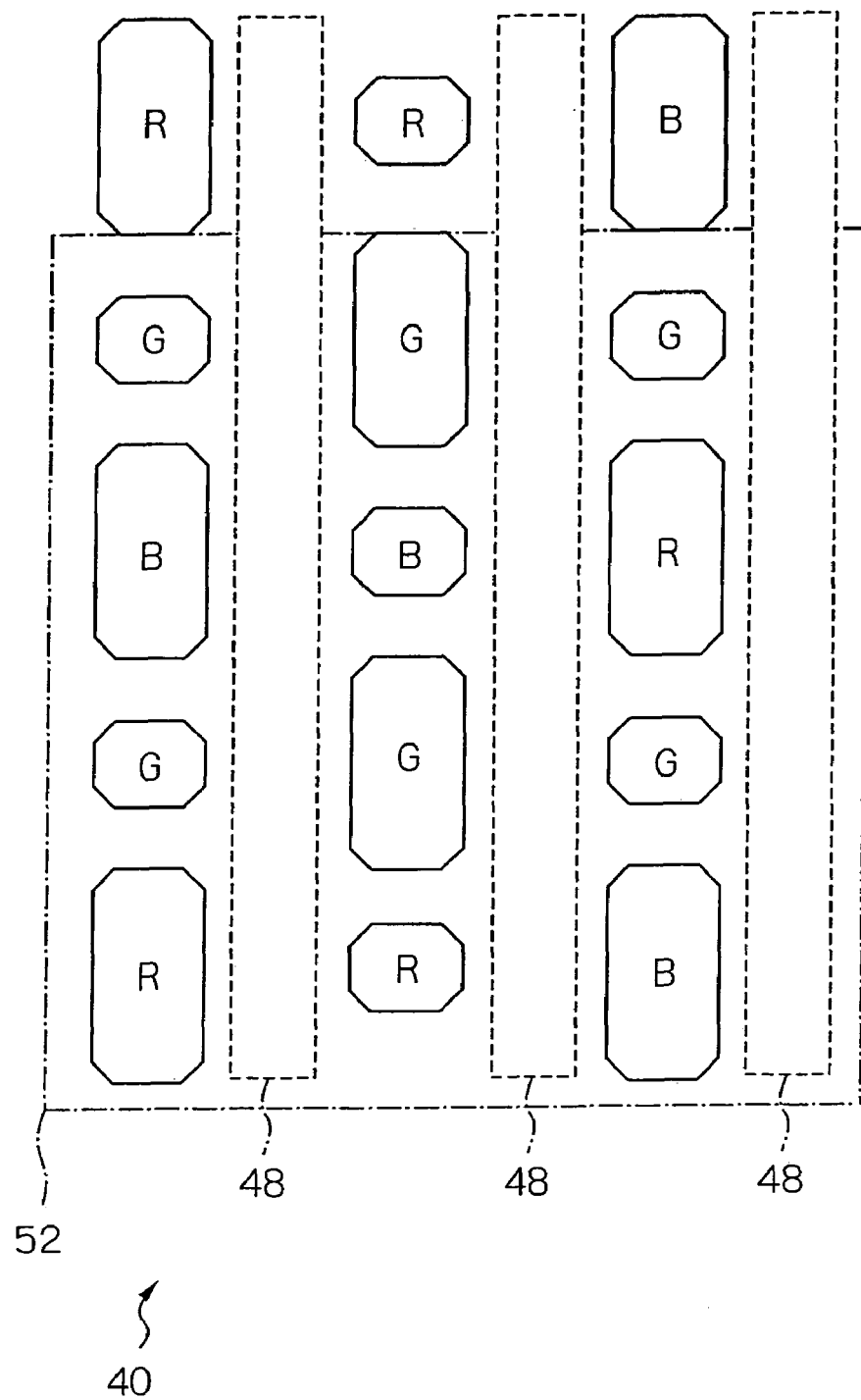
FIG. 12 is a schematic partial plan view, similar to FIG. 4, showing another specific arrangement of color filters applicable to the arrangement of photo-sensitive cells of FIG. 2.

FIG. 12 shows another specific arrangement of the color filter 40. As shown, the color filter 40 is identical with the color filter 40 of FIG. 2 in that the high-sensitivity pixels 44 are arranged in a G square, RB full-checkerboard pattern. The difference is that, in FIG. 12, the color R of the low-sensitivity pixels 46 is arranged in the horizontal direction or direction of rows while the colors R and B of the pixels 46 are positioned above and below, in the figure, the color G of the high-sensitivity pixels 44 alternately with each other.

As stated above, in the illustrative embodiment, a pair of high-sensitivity photo-sensitive cells 44 are positioned at one diagonal corners while a pair of low-sensitivity photo-sensitive cells 44 are positioned at the other diagonal corners, so that the photo-sensitive cells 44 and 46 are arranged in a zigzag pattern at opposite sides of each vertical transport path 48. In this configuration, there can be produced the pixels of, e.g., the photo-sensitive cells 44 over all lines even in half a field of pixels, compared to a conventional image produced from either one of high-sensitivity and low-sensitivity photo-sensitive cells by driving in interlace scanning a solid-state image sensor adaptive to a broad dynamic range. The illustrative embodiment frees an image from the deterioration of resolution, and provides each of the group of photo-sensitive cells 44 and the group of photo-sensitive cells 46 with a particular photo-sensitive area to thereby produce even pixel data different in sensitivity and saturation signal level.

In the illustrative embodiment, the optical aperture or photo-sensitive area of the photo-sensitive cells 44 is made relatively longer in the direction in which the vertical transfer paths 48 extend while the aperture of the photo-sensitive cells 46 is made relatively shorter in the same direction. This successfully provides each of the photo-sensitive cells 44 and photo-sensitive cells 46 with particular sensitivity. The photo-sensitive area of the photo-sensitive cells 46 should preferably be selected in accordance with the sensitivity and saturation level of the photo-sensitive cells 44.

Transfer electrodes for implementing packets of charge each are formed by the repeated pattern of a parallelogram and a trapezoid, so that each vertical transfer path 48 is provided with a broad opening area and therefore high transfer efficiency. The enhancement of transfer efficiency contributes a great deal to the cancellation of undesirable single-color vertical lines apt to appear in an image.

In the image sensor 42, a transfer gate having an opening/closing function is formed between each of the photo-sensitive cells 44 and 46 and adjoining vertical transfer path 48, causing a signal charge to be stored in the photo-sensitive cell 44 or 46 and then read out to the path 48. Also, a particular signal line 100 or 102 for feeding a transfer gate signal, which selectively causes the transfer gate to open or close, is assigned to each of the photo-sensitive cells 44 and 46. This arrangement allows signal charges stored in the photo-sensitive cells 44 and 46 to be read out independently of each other.

Signal charges stored in the photo-sensitive cells 44 are collectively read out to the vertical transfer paths 48 via the transfer gates in synchronism with the first-field vertical synchronous signal VD. Subsequently, signal charges stored in the photo-sensitive cells 46 are collectively read out to the vertical transfer paths 48 via the transfer gates in synchronism with the second-field vertical synchronous signal VD. The signal charges thus read out to the vertical transfer paths 48 are transferred toward a horizontal transfer path in response to the four-phase drive signals V1 through V4. Thus, signal charges with particular sensitivity can be output in each field.

The image sensor 42 allows only signal charges stored in the photo-sensitive cells 44 to be read out allows signal charges stored in the photo-sensitive cells 44 and 46 to be sequentially read out in dependence on the scene of a field. Particularly, when signal charges are read out only from the photo-sensitive cells 44, not only the read-out of signal charges is simplified, but also the signal processor 18 can use conventional pixel interpolation because of the honeycomb arrangement of pixels to thereby improve picture resolution.

The entire disclosure of Japanese patent application Nos. 2004-336494 and 2005-175727 filed on Nov. 19, 2004 and Jun. 15, 2005, respectively, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image sensing device comprising:
   photo-sensitive cells arranged in a bidimensional array for converting incident light to corresponding signal charges;
   a plurality of vertical transfer paths for transferring the signal charges read out from the photo-sensitive cells in a vertical direction; and
   a horizontal transfer path for transferring in a horizontal direction the signal charges transferred over the plurality of vertical transfer paths,
   wherein the photo-sensitive cells comprise first photo-sensitive cells and second photo-sensitive cells each having particular sensitivity to incident light,
   wherein the photo-sensitive cells are arranged such that the first photo-sensitive cells are positioned on diagonal corners at opposite sides of each of the vertical transfer paths and the second photo-sensitive cells are positioned at other diagonal corners at opposite sides of the vertical transfer path, such that the first photo-sensitive cells and the second photo-sensitive cells positioned at the diagonal corners have photo-sensitive areas whose centers of gravity form a rectangle when connected by a virtual line, and
   wherein the vertical transfer paths comprise transfer electrodes for forming packets for storing the signal charges read out from the first photo-sensitive cells and the second photo-sensitive cells, the transfer electrodes being formed in a pattern in which a combination of a parallelogram and a trapezoid is repeated.

2. The device in accordance with claim 1, wherein the first photo-sensitive cells each have a first opening, which forms the photo-sensitive area, relatively longer in a transfer direction of the vertical transfer paths while the second photo-sensitive cells each have a second opening, which forms the photo-sensitive area, relatively shorter in the transfer direction.

3. The device in accordance with claim 2, wherein the photo-sensitive area of the second opening is selected in accordance with the sensitivity and a saturation level of the first photo-sensitive cells.

4. The device accordance with claim 1, further comprising:
   transfer gates each fanned between each of the photo-sensitive cells and associated one of the vertical transfer paths, each of the transfer gates having an opening and closing function of causing the signal charges to be stored in the photo-sensitive cells and then read out to the vertical transfer paths; and
   signal lines each assigned to respective one of the first photo-sensitive cells and the second photo-sensitive cells for feeding signals for selectively opening or closing the transfer gates.

5. The device in accordance with claim 4, wherein the signal charges are read out only from the first photo-sensitive cells to the vertical transfer paths via the transfer gates in synchronism with a first-field vertical synchronous signal, and then the signal charges are read out only from the second photo-sensitive cells to the vertical transfer paths via the transfer gates in synchronism with a second-field vertical synchronous signal, the signal charges read out to the vertical transfer paths being transferred in response to four-phase drive signals.

6. The device in accordance with claim 4, wherein the device selectively executes, in accordance with a scene of a field, a drive for reading out the signal charges only from the first photo-sensitive cells or a drive for sequentially reading out the signal charges from the first photo-sensitive cells and the second photo-sensitive cells.

7. A solid-state image pickup apparatus comprising:
a solid-state image sensor comprising photo-sensitive cells arranged in a bidimensional array for converting incident light to corresponding signal charges, a plurality of vertical transfer paths for transferring the signal charges read out from the photo-sensitive cells in a vertical direction, and a horizontal transfer path for transferring in a horizontal direction the signal charges transferred over the plurality of vertical transfer pats;
a signal processor for processing an image signal output from the solid-state image sensor;
a timing signal generator for generating timing signals for providing each of the solid-state image sensor and the signal processor with a particular operation timing;
a drive signal generator for generating drive signals in response to the timing signals; and
a controller for determining a scene of a field on a basis of data fed from the signal processor and controlling the signal processor, the timing signal generator and the drive signal generator in accordance with a result of determination,
wherein the photo-sensitive cells comprising first photo-sensitive cells and second photo-sensitive cells each having particular sensitivity to incident light,
wherein the photo-sensitive cells are arranged such that the first photo-sensitive cells are positioned on diagonal corners at opposite sides of each of the vertical transfer paths and the second photo-sensitive cells are positioned at other diagonal corners at opposite sides of the vertical transfer path, such that the first photo-sensitive cells and the second photo-sensitive cells positioned at the diagonal corners have photo-sensitive areas whose centers of gravity form a rectangle when connected by a virtual line, and
wherein the vertical transfer paths comprise transfer electrodes for forming packets for storing the signal charges read out from the first photo-sensitive cells and the second photo-sensitive cells, the transfer electrodes being formed in a pattern in which a combination of a parallelogram and a trapezoid is repeated.

8. The apparatus in accordance with claim 7, wherein the first photo-sensitive cells each have a first opening, which forms the photo-sensitive area, relatively longer in a transfer direction of the vertical transfer paths while the second photo-sensitive cells each have a second opening, which forms the photo-sensitive arcs, relatively shorter in the transfer direction.

9. The apparatus in accordance wit claim 8, wherein the photo-sensitive area of the second opening is selected in accordance with the sensitivity and a saturation level of the first photo-sensitive cells.

10. The apparatus in accordance with claim 7, wherein the solid-state image sensor further comprises:
transfer gates each tuned between each of the photo-sensitive cells and associated one of the vertical transfer paths and having an opening and closing function for causing the signal charges to be stored in the photo-sensitive cells and then read out to the vertical transfer paths; and
signal lines each assigned to respective one of the first photo-sensitive cells and the second photo-sensitive cells for feeding signals for selectively opening or closing the transfer gates.

11. The apparatus in accordance with claim 10, wherein the signal charges are read out only from the first photo-sensitive cells to die vertical transfer paths via the transfer gates in synchronism with a first-field vertical synchronous signal, and ten the signal charges are read out only from die second photo-sensitive cells to the vertical transfer paths via the transfer gates in synchronism with a second-field vertical synchronous signal, and
the signal charges read out to the vertical transfer paths being transferred in response to four-phase drive signals.

12. The apparatus in accordance with claim 11, wherein the image sensor selectively executes, in accordance with a scene of a field, a drive for reading out the signal charges only from the first photo-sensitive cells or a drive for sequentially reading out the signal charges from the first photo-sensitive cells and the second photo-sensitive cells.

13. solid-state image sensing device comprising:
photo-sensitive cells arranged in a bidimensional array for converting incident light to corresponding signal charges;
a plurality of vertical transfer paths for transferring the signal charges read out from the photo-sensitive cells in a vertical direction; and
a horizontal transfer pat for transferring in a horizontal direction the signal charges transferred over the plurality of vertical transfer paths,
wherein the photo-sensitive cells comprise first photo-sensitive cells and second photo-sensitive cells each having particular sensitivity to incident light,
wherein the photo-sensitive cells are arranged such tat the first photo-sensitive cells are positioned on diagonal corners at opposite sides of each of the vertical transfer paths and the second photo-sensitive cells are positioned at other diagonal corners at opposite sides of the vertical transfer path, such that the first photo-sensitive cells and the second photo-sensitive cells positioned at the diagonal corners have photo-sensitive areas whose centers of gravity form a rectangle when connected by a virtual line, and
wherein the vertical transfer paths comprise transfer electrodes for forming packets for storing the signal charges read out from the first photo-sensitive cells and the second photo-sensitive cells, the transfer electrodes being formed in a pattern in which a combination of trapezoids is repeated.

14. The device in accordance with claim 13, wherein said first photo-sensitive cells each have a first opening, which forms the photo-sensitive area, relatively longer in a transfer direction of said vertical transfer paths while said second photo-sensitive cells each have a second opening, which forms the photo-sensitive area, relatively shorter in the transfer direction.

15. The device in accordance with claim 14, wherein the photo-sensitive area of the second opening is selected in accordance with the sensitivity and a saturation level of said first photo-sensitive cells.

16. The device accordance with claim 13, further comprising:
transfer gates each formed between each of said photo-sensitive cells and associated one of said vertical transfer paths, each of said transfer gates having an opening and closing function of causing the signal charges to be stored in said photo-sensitive cells and then read out to said vertical transfer paths; and
signal lines each assigned to respective one of said first photo-sensitive cells and said second photo-sensitive cells for feeding signals for selectively opening or closing said transfer gates.

17. The device in accordance with claim 16, wherein the signal charges reread out only from said first photo-sensitive cells to said vertical transfer paths via said transfer gates in synchronism with a first-field vertical synchronous signal, and then the signal charges are read out only from said second photo-sensitive cells to said vertical transfer paths via said transfer gates in synchronism with a second-field vertical synchronous signal, the signal charges read out to said vertical transfer paths being transferred in response to four-phase drive signals.

18. The device in accordance with claim 16, wherein said device selectively executes, in accordance with a scene of a field, a drive for reading out the signal charges only from said first photo-sensitive cells or a drive for sequentially reading out the signal charges from said first photo-sensitive cells and said second photo-sensitive cells.

19. A solid-state image pickup apparatus comprising:
a solid-state image sensor comprising photo-sensitive cells arranged in a bidimensional array for converting incident light to corresponding signal charges, a plurality of vertical transfer paths for transferring the signal charges read out from the photo-sensitive cells in a vertical direction, and a horizontal transferring for transferring in a horizontal direction the signal charges transferred over the plurality of vertical transfer paths;
a signal processor for processing an image signal output from the solid-state image sensor;
a timing signal generator for generating timing signals for providing each of the solid-state image sensor and the signal processor with a particular operation, timing;
a drive signal generator for generating drive signals in response to the timing signals; and
a controller for determining a scene of a field on a basis of data fed from the signal processor and controlling the signal processor, the timing signal generator and the drive signal generator in accordance with a result of determination,
wherein the photo-sensitive cells comprising first photo-sensitive cells and second photo-sensitive cells each having particular sensitivity to incident light,
wherein the photo-sensitive cells are arranged such that the first photo-sensitive cells are positioned on diagonal corners at opposite sides of each of the vertical transfer paths and the second photo-sensitive cells are positioned at other diagonal corners at opposite sides of the vertical transfer path, such that the first photo-sensitive cells and the second photo-sensitive cells positioned at the diagonal corners have photo-sensitive areas whose centers of gravity form a rectangle when connected by a virtual line, and
wherein the vertical transfer paths comprise transfer electrodes for forming packets for storing the signal charges read out from the first photo-sensitive cells and the second photo-sensitive cells, the transfer electrodes being formed in a pattern in which a combination of trapezoids is repeated.

20. The apparatus in accordance with claim 19, wherein said first photo-sensitive cells each have a first opening, which forms the photo-sensitive area, relatively longer in a transfer direction of the vertical transfer paths while said second photo-sensitive cells each have a second opening, which forms the photo-sensitive area, relatively shorter in said transfer direction.

21. The apparatus in accordance with claim 20, wherein the photo-sensitive area of said second opening is selected in accordance with the sensitivity and a saturation level of said first photo-sensitive cells.

22. The apparatus in accordance with claim 19, wherein said solid-state image sensor further comprises:
transfer gates each formed between each of said photo-sensitive cells and associated one of said vertical transfer paths and having an opening and closing function for causing the signal charges to be stored in said photo-sensitive cells and then read out to said vertical transfer paths; and
signal lines each assigned to respective one of said first photo-sensitive cells and said second photo-sensitive cells for feeding signals for selectively opening or closing said transfer gates.

23. The apparatus in accordance with claim 22, wherein the signal charges are read out only from said first photo-sensitive cells to said vertical transfer paths via said transfer gates in synchronism with a first-field vertical synchronous signal, and then the signal charges are read out only from said second photo-sensitive cells to said vertical transfer paths via said transfer gates in synchronism, with a second-field vertical synchronous signal, and
the signal charges read out to said vertical transfer paths being transferred in response to four-phase drive signals.

24. The apparatus in accordance with claim 23, wherein said image sensor selectively executes, in accordance with a scene of a field, a drive for reading out the signal charges only from said first photo-sensitive cells or a drive for sequentially reading out the signal charges from said first photo-sensitive cells and said second photo-sensitive cells.

* * * * *